July 30, 1946.  A. BECKELMAN  2,404,941
APPARATUS FOR FORMING AN ORNAMENTAL TRIMMING
Filed Aug. 18, 1944  3 Sheets-Sheet 1
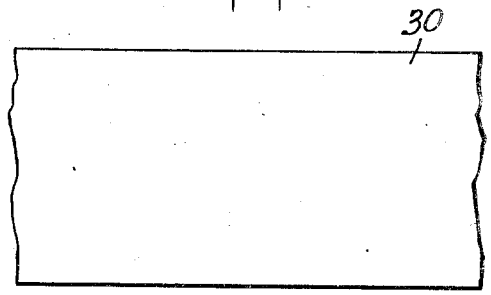
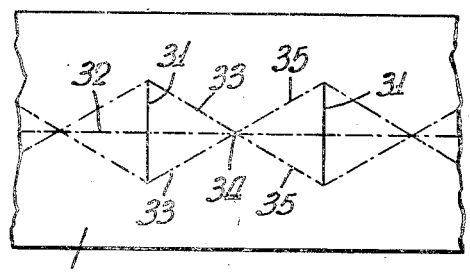
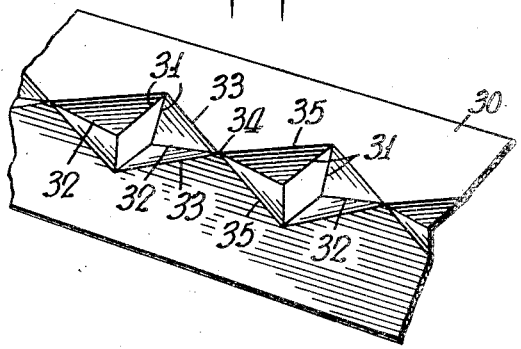
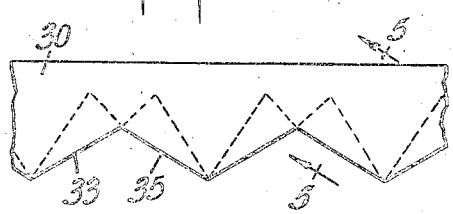
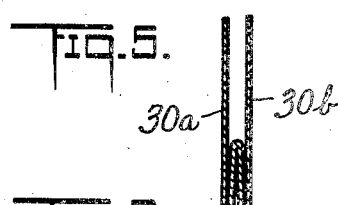
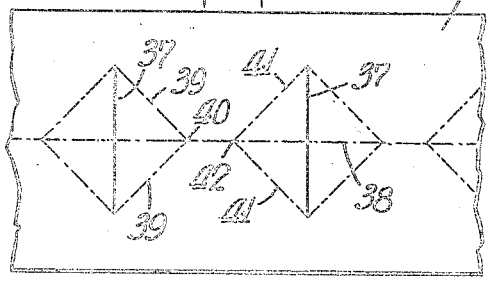
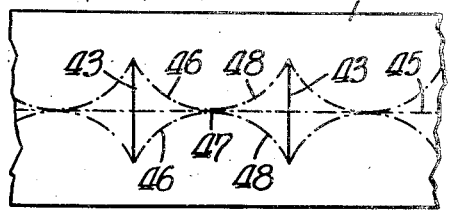
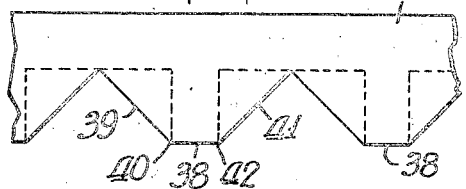
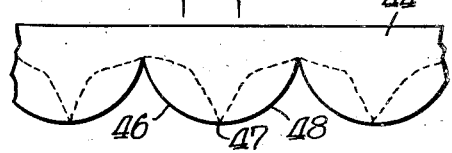
INVENTOR
Abraham Beckelman
BY
Frederick Breitenfeld
ATTORNEY July 30, 1946.　　　A. BECKELMAN　　　2,404,941
APPARATUS FOR FORMING AN ORNAMENTAL TRIMMING
Filed Aug. 18, 1944　　　3 Sheets-Sheet 2
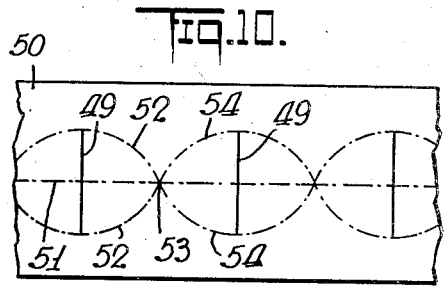
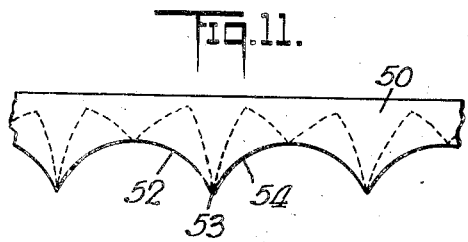
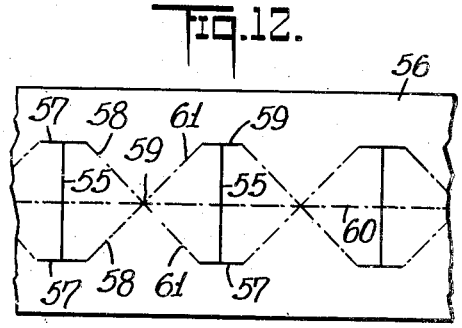
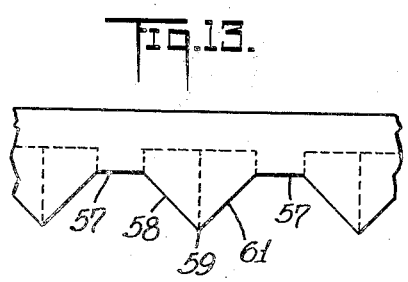
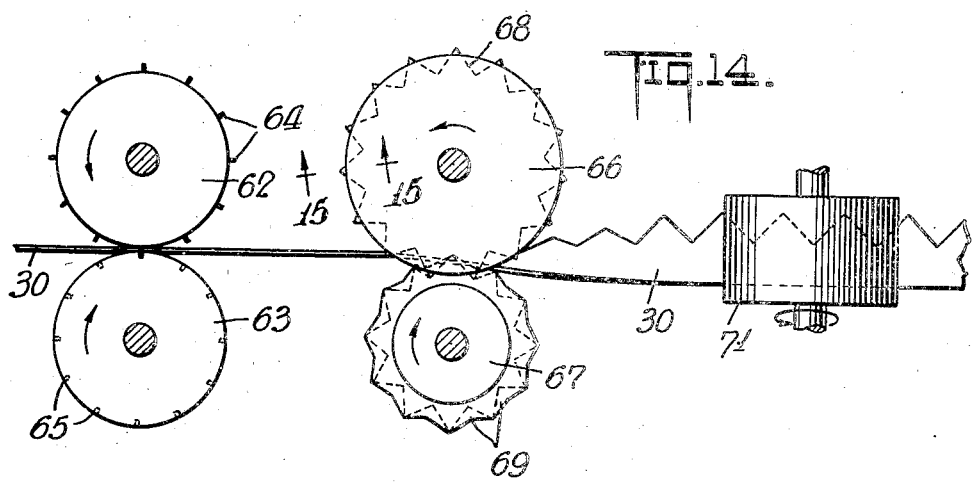
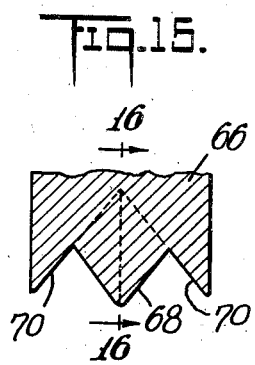
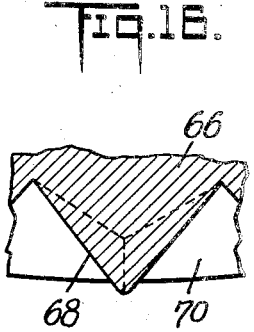
INVENTOR
Abraham Beckelman
BY
Frederick Breitenfeld
ATTORNEY

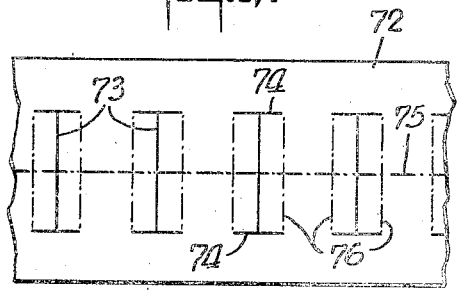
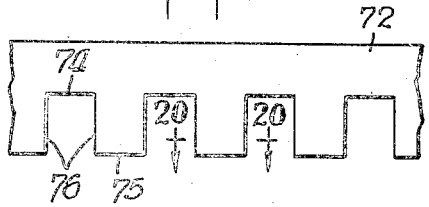
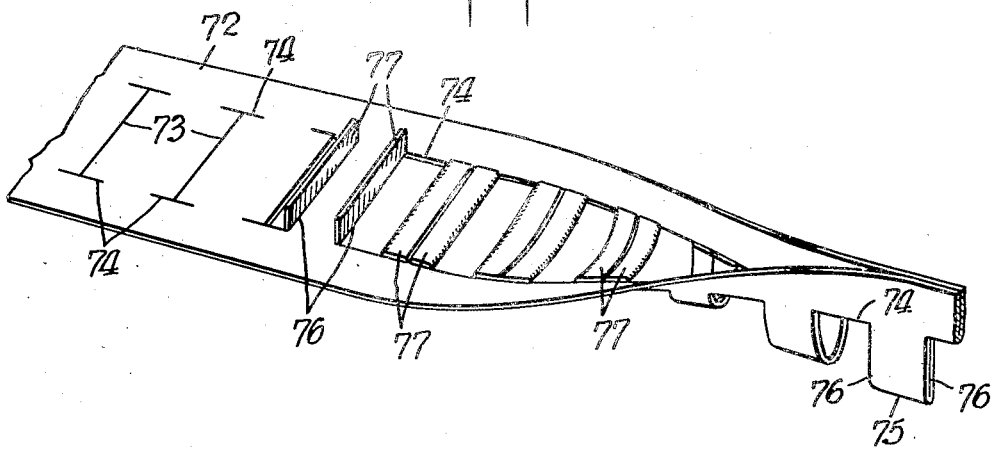

Patented July 30, 1946

2,404,941

UNITED STATES PATENT OFFICE 2,404,941

APPARATUS FOR FORMING AN ORNAMENTAL TRIMMING

Abraham Beckelman, New York, N. Y.

Application August 18, 1944, Serial No. 550,112

7 Claims. (Cl. 223—44)

My present invention relates generally to the art of making items of so-called "passementerie," and has particular reference to the manufacture of an improved and simplified type of ornamental trimming for association with garments and the like.

More particularly, the type of trimming to which the invention is primarily directed consists of a length of fabric or similar material having one of its longtudinal edges of ornamental serrated character. By the term "serrated" as used herein and in the appended claims, I intend to refer generally to a configuration which has successive lateral projections, whether they be pointed like saw-teeth, rounded like "scallops," or otherwise contoured.

Trimmings of this general nature have heretofore been hand-made, either by stitching together separately-formed elements, piece by piece, or by successively stitching separate elements, side by side, to a base strip, or in other similar ways which are relatively time-consuming and expensive.

One of the objects of the present invention is to provide an item or ornamental trimming of the character referred to, which is composed of a single piece of material, which is in every way as good as, if not better than, the ordinary hand-made trimming, which requires no stitching operations (either hand-made or otherwise), and which lends itself readily to relatively inexpensive machine manufacture. The present improved article is of such a character that it may be manufactured in unlimited lengths by means of a relatively simple apparatus, and in accordance with a continuous method which treats successive regions of an original continuous strip of material to transform it into a correspondingly continuous length of the trimming desired.

The main objects of my invention relate not only to the resultant article itself, but also to the improved apparatus by which it may be made, and to the novel series of procedural steps by which it is formed.

Essentially and briefly, the invention is predicated upon the treatment of an elongated strip of suitable fabric or equivalent material to form a series of transverse longitudinally-spaced slits therein, to double the strip upon itself along a longitudinal axis which intersects said slits, and to fold the material directly adjacent to each slit into an inwardly-disposed sandwiched position between the resultant two plies. This procedure, which consists essentially of only cutting and creasing, avoids the necessity for any stitching operations, and results in the creation of a form-retaining element of ornamental trimming which is neat in appearance, uniform in quality and configuration, and inexpensive to produce.

By properly arranging the slits in any of a number of ways, e. g., by varying the spacing, angularity, or configuration of the slits, and by properly choosing the angles or the manner in which the material is folded inwardly adjacent to the slits, varying effects can be produced. For example, a serrated trimming can be formed which has either pointed or blunted serrations, these serrations may be arranged in relatively close proximity or in spaced relations, and they may have straight edges, or edges of concave or convex curvature.

In accordance with one method of folding the material adjacent to each slit, an inwardly-tucked sandwiched portion is produced which has the general shape of an arrow-head whose base is the slit and whose apex lies on the longitudinal fold of the trimming. Another illustrative procedure results in forming a tucked-in sandwiched portion of material which is substantially the shape of a parallelogram whose base and sides are defined by a slit having serifs.

The desired folding of the material is preferably accomplished by one or more pairs of complementary creasing dies adapted to engage between them a transversely-slitted region of the strip, the dies having suitably-contoured opposed faces. In certain cases, a single set of such dies is sufficient to double the strip upon itself along a longitudinal axis and to fold inwardly the material directly adjacent to the slit. In other cases, two or more sets of dies may be employed to produce the desired result.

Preferably, the apparatus employed is of a character which carries out a continuous process, the apparatus including a means for progressively cutting the desired transverse slits into an advancing continuous strip of material, and a creasing means operated in timed relation to the cutting means for successively engaging and performing its work upon the slitted regions of the strip. Excellent results are obtained when the apparatus also includes a pressing means adapted to act upon the creased article to press it firmly into its final condition.

In a preferred embodiment of the apparatus, the cutting, creasing, and pressing, are carried out by means of successive pairs of rollers or similar instrumentalities through which the continuous strip is directed.

I achieve the foregoing general objects and advantages, and such other objects and advantages as may hereinafter appear or be pointed out, in the manner illustratively exemplified in the accompanying drawings, in which:

Figure 1 is a fragmentary plan view of an original strip of material of which the desired trimming is to be made;

Figure 2 is a view similar to Figure 1 showing an illustrative pair of adjacent transverse slits, and indicating the lines along which folding or creasing is to be effected;

Figure 3 is a perspective view of a portion of the strip of Figure 2 illustrating the relationship of the areas as the folding is carried out;

Figure 4 is a plan view of a section of the finished trimming;

Figure 5 is a cross-sectional view taken substantially along the line 5—5 of Figure 4;

Figure 6 is a view similar to Figure 2 illustrating a different spacing of the slits and a different method of folding of the material;

Figure 7 is a plan view of a section of the finished trimming resulting from the treatment indicated in Figure 6;

Figures 8 and 9 are views which correspond, respectively, with Figures 6 and 7, illustrating a further modification;

Figures 10 and 11 are views which correspond, respectively, with Figures 6 and 7, illustrating a further modification;

Figures 12 and 13 are views which correspond, respectively, with Figures 6 and 7, illustrating a further modification;

Figure 14 is a diagrammatic view of an apparatus which may be employed in continuously forming trimmings of the character illustrated and shown in Figures 4, 7, 9, 11 and 13;

Figure 15 is an enlarged fragmentary cross-sectional view taken substantially along the line 15—15 of Figure 14;

Figure 16 is a fragmentary cross-sectional view taken substantially along the line 16—16 of Figure 15;

Figure 17 is a plan view of a portion of an original strip which has been slit and which is to be folded in a somewhat different manner;

Figure 18 is a perspective view illustrating the manner in which the material of Figure 17 is to be folded;

Figure 19 is a plan view of a section of the finished trimming resulting from the treatment indicated in Figure 18; and Figure 20 is an enlarged cross-sectional view taken substantially along the line 20—20 of Figure 19.

The strip 30 of Figure 1 need not necessarily be selvaged along its opposite longitudinal edges, and it may be composed of any suitable sheet material, such as fabric or the like. It is continuous in length and may have any desired width, depending upon the trimming to be formed. As an indication of the general nature of the invention, the strip 30 of Figure 1 may be, for example, about an inch and a half or two inches in width, but it will be understood that these dimensions are given merely by way of illustration.

The first step in the treatment of the strip 30 is to form in it a series of longitudinally-spaced transverse slits. In Figure 2 I have illustrated two such slits 31, and it will be observed that the slits are arranged at right angles to the longitudinal axis 32 of the strip, that the slits are straight, and that they are medially arranged so as to intersect the axis 32. The converging diagonal lines 33 are straight, thus defining an isosceles triangle whose base is the slit 31 shown at the left of Figure 2, and whose apex 34 lies on the axis 32. This triangular area may be said to have substantially the shape of an arrow-head, and represents the area which is to be folded inwardly into a tucked-in condition when the trimming is formed.

A similar set of fold lines 35 emanate from the other slit 31, and in the embodiment illustrated the apex of the resultant arrow-head is coincident with the point 34. This same pattern of fold lines may be continued between each pair of adjacent slits, or between a selected number of such pairs.

In forming the desired trimming, the strip 30 is folded upon itself along the axis 32 and the arrow-head areas are folded inwardly, i. e., in a reverse direction, so that ultimately a two-ply construction results, as indicated in Figure 5 in which the reference numerals 30a and 30b have been applied to the two plies referred to. Each of the arrow-head areas now lies in sandwiched position between these two plies, thereby imparting a serrated configuration to the folded edge of the article. It will be observed that the point 34 defines the apex of one of these serrations, and that the two sides of the serrations are straight lines defined by the fold lines 33 and 35 respectively. The serration is thus of saw-tooth character, and if the same style of slits and manner of folding is maintained along the length of the strip, an ornamental trimming is produced which has a series of closely adjacent saw-tooth serrations along one edge.

If the material is firmly and properly creased and pressed, with or without the aid of such steaming or other treatment as may prove to be desirable, the finished article is entirely self-sustaining. In use, it is usually attached to a garment or other item to be ornamented by means of a row of stitching (not shown) which will lie adjacent to the unserrated edge, substantially parallel to the latter.

By making the slits longer, or by arranging them closer together, or both, the angularity of the saw-tooth serrations may be varied to suit differing requirements.

If a blunted saw-tooth serration is desired, the fold lines are planned in a slightly different manner, as indicated in Figures 6 and 7. In these figures, a strip 36 is provided with spaced transverse slits 37 which extend across the longitudinal fold axis 38. The area to be sandwiched between the resultant two plies (when the strip is folded upon itself along the line 38 as indicated in Figure 7) is again a triangular or arrow-head area but the apexes of adjacent opposed areas are longitudinally spaced from each other. Thus, in Figure 6, the fold lines 39 converge to an apex 40 while the fold lines 41 converge to an apex 42 which is spaced from the point 40. If this arrangement of slits and manner of folding is maintained along a length of the strip 36, a serrated ornamental effect is produced as shown in Figure 7, each serration having straight converging sides (39 and 41) and a blunted end.

As in the preceding embodiment, it is to be noted that the edges of the serrations are fold lines and thus present no raw edges which might ravel or be unsightly.

A further possible modification is illustrated in Figures 8 and 9. The slits 43 are arranged in spaced relation in the strip 44, which is ultimately to be folded upon itself along the longitudinal axis 45. The fold lines are in this case similar to those of Figure 2 except that they are curved so as to define arrow-head areas having concave sides. Thus, the fold lines 46 define a concave arrow-head whose base is the slit to the left of them and whose apex 47 lies along the axis 45. A similar set of fold lines 48 is associated with the next adjacent slit, and the apex of the resultant arrow-head area coincides with the point 47. The result ultimately produced is shown in Figure 9 in which it will be observed that the serration formed between the slits 43 has convex edges, thus producing a scallop-like effect.

It will be understood that the convex edges 46 and 48 as viewed in Figure 9, need not necessarily be tangent to each other at the point 47.

The matter of folding the material along a curved line, rather than a straight one, presents no problem, since the sandwiched material adjusts itself to the desired curvature during the creasing and pressing operations. In other words, each sandwiched area will have a multiplicity of creases in it, to define the curved fold line desired, but the presence of these creases on the interior of the structure is not objectionable. The dotted lines of Figure 9 are intended to indicate the approximate disposition of the tucked-in regions, but it will be understood that this is not an accurate representation (as in Figures 4 and 7) because of the fact that a multiplicity of pleats or creases will form themselves as the material is folded inwardly.

The same general comments are applicable to the modification illustrated in Figures 10 and 11 which is in every respect similar to that of Figures 8 and 9 except that the fold lines are curved in the opposite direction. Thus, after forming the slits 49 in the strip 50, the latter is doubled upon itself along the longitudinal axis 51, and the regions adjacent to the slits are folded inwardly (as indicated approximately by the dotted lines in Figure 11) to define an ornamental serrated edge in which each serration is pointed and has concave sides. More particularly, it will be observed that the fold lines 52 define a convex arrow-head whose base is the slit 49 to the left and whose apex is at the point 53 on the axis 51, while the fold lines 54 define a similar arrow-head based on the slit 49 to the right. The point 53 defines the apex of one of the serrations, as indicated in Figure 11, and it will be understood that the cooperating curved edges need not necessarily be tangent to one another where they meet the adjacent serration.

In Figures 12 and 13 I have illustrated a possible modification in which each of the slits is provided with serifs at its ends. It will be observed that each of the transverse slits 55, formed in the strip 56, is provided with a relatively small slit 57 arranged crosswise at each end, thus producing a sort of I-shaped cut. If the diagonal fold lines are arranged substantially as in Figure 2, the folding and creasing of the strip in the manner hereinbefore described will result in producing an ornamental serrated edge of the character shown in Figure 13. More particularly, the converging fold lines 58 define an arrow-head area whose base is the slit 55 to the left and whose apex 59 lies on the longitudinal axis 60, while the corresponding inclined fold lines 61 define a similar arrow-head area whose base is the slit 55 to the right and whose apex is coincident with the point 59. The latter thus forms the apex of a saw-tooth serration whose sides are straight (58 and 61), and this construction differs from that of Figure 4 merely in the spacing of the serrations from one another. This spacing is the direct result of the provision of the serif-like slits 57.

It will be understood, of course, that the curved fold lines illustratively exemplified in Figures 8–11, may be associated with slits having serifs as indicated in Figures 12 and 13, also that the arrow-head areas need not necessarily have common apexes but may have their apexes spaced as in Figures 6 and 7, and that varying effects and different ornamental results can be achieved by a judicious variation of these several factors, all without altering the essential characteristics of the trimming.

In carrying out the manufacture of trimmings as hereinbefore described, I prefer to employ an apparatus of the character diagrammatically illustrated in Figures 14–16. Assuming, for example, that the strip 30 of Figure 1 is to be continuously formed into a trimming as shown in Figure 4, this strip will be continuously advanced from left to right (as viewed in Figure 14) and will pass successively into the field of action of the several pairs of rollers indicated. The first pair of rollers 62 and 63 is provided with a cutting means so that as the strip 30 passes between them, the desired transverse slits are formed therein. The roller 62 may be provided, for example, with a series of radial cutters 64 adapted to cooperate with corresponding recesses 65 in the roller 63, the circumferential spacing of the cutters, and their shapes, determining the longitudinal spacing and nature of the slits that are produced in the strip 30.

The slitted strip may then pass through a pair of complementary rollers 66 and 67, which define between them at least one pair of complementary creasing dies. These rollers are operated in timed relation to the cutting means, so that the creasing dies will successively operate upon each slitted region of the strip. In the illustrated apparatus, the roller 66 is provided with a plurality of pyramidal faces 68 and the roller 67 is provided with recesses 69 of complementary character and shape. One of the projections 68 is shown by itself in Figures 15 and 16. It will be observed that the die is provided with oppositely-inclined surfaces 70 extending around the periphery of the roller. These surfaces engage the strip 30 so as to fold it along its longitudinal axis, while the pyramidal projection 68 engages the slitted region of the strip and forces it inwardly (as illustrated in Figure 3). This inward folding is thus effected and controlled by the contour of the projection 68 and of the complementary recess 69. Depending upon the nature of the creases desired, whether curved or straight or composite, the projections 68 and the complementary portions 69 of the creasing dies have angularities and contours of suitable character.

The strip emanating from the action of the creasing mechanism is in doubled-over condition, and it is then desirable, in most cases, to feed this product through a pair of pressing rollers 71. Only one such roller is shown in Figure 14, but it will be understood that a similar roller is arranged in cooperating relationship on the opposite side of the strip 30. The axis of rotation of each of the rollers 71 is preferably at right angles to the axes of the cutting and creasing rollers, since the action of the creasing rollers swings the plane of the advancing strip through 90°. If desired, however, the rollers 71 may be arranged to rotate on axes parallel to the other pairs of rollers in which case the strip emanating from the creasing rollers will twist through 90° before it encounters the rollers 71.

The roller I have chosen to show at 71 in Figure 14 has a smooth peripheral surface, but it will be understood that by providing one or both of the rollers 71 with suitably contoured faces, various ornamental embossing effects may be produced on the trimming.

It will also be understood that the cutting procedure may be separately performed, at any time and in any manner prior to the feeding of the slitted strip to the action of one or more creasing dies. Furthermor, either the creasing dies or the pressing rollers, or both, may be suitably heated, if desired, or the strip may in other ways be subjected to steaming or similar treatment so that the finished trimming emanating from the pressing instrumentality will retain its creased condition.

While I have illustratively shown one complete set of cutting, creasing, and pressing instrumentalities, it is within the purview of my invention to arrange and operate a plurality of such sets in parallel relationship. For example, the shafts on which the rollers 62 and 63 are mounted may have other pairs of rollers of similar type mounted thereon, and similar multiples of creasing rollers and pressing rollers may be provided for in the same way. As a result two or more original strips of material may be treated simultaneously by means of apparatus attended by a single operator and driven from a common source or sources, and such strips may emanate in the form of trimmings which are either identical with one another or different in design depending upon the cutting and creasing operations to which they have been respectively subjected.

In Figures 17-20 I have illustrated a modification in which the areas adjacent to the slits are not of arrow-head shape, although the basic nature of the process and apparatus, and of the resultant article, has not been altered.

In this embodiment, the strip 72 is provided with a series of slits 73 each of which has serifs 74 at its opposite ends. In addition to the fold line 75 arranged along the longitudinal axis of the strip, fold lines 76 are produced which are parallel to the body portions of the slits 73. The treatment of the strip 72 is best indicated in Figure 18 in which the successive steps have been diagrammatically represented. The first step is to fold the areas 77 inwardly along the fold line 76. This carries them through the parallel disposition shown at the left of Figure 18 and ultimately positions them flatwise against the inner surface of the strip. When the latter is doubled upon iself along the longitudinal axis 75, a series of serrations are formed which are blunted, spaced from each other, and parallelogrammic in shape. This produces an ornamental trimming of the character shown most clearly in Figure 19. Each of the serrations has edges which are defined by folds (see Figure 20), and there are no raw edges. It is true that the inner edges 74, initially defined by the serifs on the slits 73, are raw and unfinished, and this is a condition which is also present in the embodiment of Figure 13, but when the trimming is used, it is customary to associate it with a garment edge or the like in such a manner that only the serrations themselves remain visible and exposed.

The treatment of the strip of Figure 17 to produce the ornamental trimming of Figure 19 may also be carried out by apparatus of the general character illustrated in Figure 14, but it will be understood that the creasing dies will be of slightly different type and shape, and that the creasing may necessitate two or more creasing operations to bring about the desired result.

If the fold lines 76 are curved rather than straight a corresponding ornamental curvature may be imparted to the sides of the serrations of the finished article.

In general, it will be understood that the details herein described and illustrated may be modified in various respects by those skilled in the art without departing from the general nature and essential characteristics of the invention.

Having thus described my invention and illustrated its use, what I claim as new and desire to secure by Letters Patent is:

1. In an apparatus for forming a length of ornamental trimming having a serrated edge, a pair of complementary creasing dies adapted to engage between them a transversely-slitted region of an elongated strip, said dies having opposed faces contoured to double said strip upon itself along a longitudinal axis intersecting said slit and to fold the material directly adjacent to said slit inwardly upon itself into sandwiched position between the resultant two plies.

2. In an apparatus for forming a length of ornamental trimming having a serrated edge, a pair of complementary rollers having their contacting faces configured to define successive pairs of complementary creasing dies, said rollers being adapted to engage between them an advancing continuous elongated strip having a series of longitudinally-spaced transverse slits therein, each pair of creasing dies having opposed faces adapted to receive a slitted region of said strip between them, said faces being contoured to double the strip upon itself along a longitudinal axis intersecting said slit and to fold the material directly adjacent to said slit inwardly upon itself into sandwiched position between the resultant two plies, whereby successive slitted regions of said strip may be subjected to the action of successive creasing dies, respectively, as said strip is advanced through the nip of said rollers.

3. In an apparatus for forming a length of ornamental trimming having a serrated edge, means for progressively cutting a series of longitudinally-spaced transverse slits into an advancing continuous elongated strip, and a creasing means operated in timed relation to said cutting means for successively engaging the slitted regions of said strip, doubling the strip upon itself along a longitudinal axis intersecting said slit, and folding the material directly adjacent to said slit inwardly upon itself into sandwiched position between the resultant two plies.

4. In an apparatus of the character described, the combination of elements set forth in claim 3, said cutting means comprising a pair of complementary rollers between which said strip passes, said rollers having their contacting faces provided with circumferentially-spaced cutting instrumentalities.

5. In an apparatus of the character described, the combination of elements set forth in claim 3, said creasing means comprising a pair of complementary rollers between which said slitted strip passes, said rollers having their contacting faces configured to define successive pairs of complementary creasing dies.

6. In an apparatus of the character described, the combination with the elements set forth in claim 3, of a pair of complementary pressing rollers adapted to receive and pass between them the doubled-over two-ply strip resulting from the action of said creasing means.

7. In an apparatus for forming a length of ornamental trimming having a serrated edge, a pair of opposed mutually cooperating instruments configured to define successive pairs of complementary creasing dies, said instruments being adapted to engage between them an advancing continuous elongated strip having a series of longitudinally-spaced transverse slits therein, each pair of creasing dies having opposed faces adapted to receive a slitted region of said strip between them, said faces being contoured to double the strip upon itself along a longitudinal axis intersecting said slit and to fold the material directly adjacent to said slit inwardly upon itself into sandwiched position between the resultant two plies, whereby successive slitted regions of said strip may be subjected to the action of successive creasing dies, respectively, as said strip is advanced between said instruments.

ABRAHAM BECKELMAN.